United States Patent
Sharifi

(10) Patent No.: US 12,246,676 B2
(45) Date of Patent: Mar. 11, 2025

(54) SUPPORTING MULTIPLE ROLES IN VOICE-ENABLED NAVIGATION

(71) Applicant: GOOGLE LLC, Mountain View, CA (US)

(72) Inventor: Matthew Sharifi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/642,175

(22) PCT Filed: Jun. 23, 2021

(86) PCT No.: PCT/US2021/038608
§ 371 (c)(1),
(2) Date: Mar. 10, 2022

(87) PCT Pub. No.: WO2022/271162
PCT Pub. Date: Dec. 29, 2022

(65) Prior Publication Data
US 2024/0067128 A1 Feb. 29, 2024

(51) Int. Cl.
*G01C 21/34* (2006.01)
*B60R 25/25* (2013.01)
(Continued)

(52) U.S. Cl.
CPC ........ *B60R 25/257* (2013.01); *G01C 21/3415* (2013.01); *G01C 21/3608* (2013.01);
(Continued)

(58) Field of Classification Search
None
See application file for complete search history.

(56) References Cited

U.S. PATENT DOCUMENTS

| | | | | |
|---|---|---|---|---|
| 5,214,707 A | * | 5/1993 | Fujimoto | ............... H04R 3/005 704/E15.045 |
| 6,587,824 B1 | * | 7/2003 | Everhart | ................ G10L 15/07 704/275 |

(Continued)

FOREIGN PATENT DOCUMENTS

| | | |
|---|---|---|
| EP | 3 470 276 A1 | 4/2019 |
| WO | WO-2008083736 A1 * | 7/2008 ......... G01C 21/3655 |

OTHER PUBLICATIONS

Teach Google Assistant to recognize your voice with Voice Match (2022). Retrieved from the Internet at: URL https://support.google.com/assistant/answer/9071681?co=GENIE.Platform%3DAndroid&hl=en-GB.

(Continued)

*Primary Examiner* — Muhammad Adnan
(74) *Attorney, Agent, or Firm* — MARSHALL, GERSTEIN & BORUN LLP

(57) ABSTRACT

To determine whether a user is authorized to make a particular audio request during navigation, a client device receives a request for navigation directions from a starting location to a destination location. The client device provides a set of navigation directions for traversing to the destination location along a route. During a navigation session, an audio request related to the route is received from a user. The client device determines an authorization level of the user based on the audio request, and provides a response to the request based on the authorization level of the user.

20 Claims, 7 Drawing Sheets

(51) Int. Cl.
  *G01C 21/36* (2006.01)
  *G06F 21/32* (2013.01)
(52) U.S. Cl.
  CPC ......... *G01C 21/3629* (2013.01); *G06F 21/32* (2013.01); *G06F 2221/2141* (2013.01)

(56) References Cited

U.S. PATENT DOCUMENTS

| | | | | |
|---|---|---|---|---|
| 9,892,732 | B1* | 2/2018 | Tian | G10L 15/24 |
| 2009/0064155 | A1* | 3/2009 | Giuli | A61B 5/18 |
| | | | | 718/103 |
| 2013/0282283 | A1* | 10/2013 | Bondesen | H04L 63/0884 |
| | | | | 701/538 |
| 2015/0192426 | A1* | 7/2015 | Foster | G01C 21/3664 |
| | | | | 709/228 |
| 2017/0093920 | A1* | 3/2017 | Ducatel | G06F 21/316 |
| 2017/0116986 | A1* | 4/2017 | Weng | G10L 13/033 |
| 2018/0211656 | A1* | 7/2018 | Chong | G10L 15/22 |
| 2018/0293049 | A1* | 10/2018 | Gupta | G06F 3/165 |
| 2019/0057703 | A1* | 2/2019 | Zeinstra | G10L 15/30 |
| 2019/0094038 | A1* | 3/2019 | Oh | B60R 16/0373 |
| 2019/0241069 | A1* | 8/2019 | Bouaziz | B60K 35/00 |
| 2019/0347387 | A1* | 11/2019 | Woodward | G16H 15/00 |
| 2020/0047687 | A1* | 2/2020 | Camhi | G10L 15/22 |
| 2020/0066280 | A1* | 2/2020 | Kim | G10L 17/00 |
| 2020/0135190 | A1* | 4/2020 | Kaja | G06V 20/593 |
| 2022/0063654 | A1* | 3/2022 | Beaurepaire | B60W 50/14 |
| 2022/0128373 | A1* | 4/2022 | Lee | G10L 15/22 |
| 2023/0324184 | A1* | 10/2023 | Wang | G01C 21/3415 |
| | | | | 701/533 |

OTHER PUBLICATIONS

International Search Report and Written Opinion for Application No. PCT/US2021/038608, dated Mar. 21, 2022.

* cited by examiner

200

Navigation Profiles

| Name | Voice | Authorization Level | Priority Level |
|------|-------|---------------------|----------------|
| John | John.mp3 | Read/Write | 1 |
| Jane | Jane.mp3 | Read/Write | 2 |
| Jim | Jim.mp3 | Read/Only | 3 |

202

Add Profile

SUPPORTING MULTIPLE ROLES IN VOICE-ENABLED NAVIGATION

FIELD OF THE DISCLOSURE

The present disclosure relates to role-based authorization in navigation and, more particularly, to preventing unauthorized users from making changes to a route during a navigation session by identifying the users based on their voices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, software applications executing in computers, smartphones, etc. or embedded devices generate step-by-step navigation directions. Typically, a user specifies the starting point and the destination using touch or voice input, and a software application displays and/or presents the directions in an audio format immediately and/or as the user travels from the starting point and the destination.

In some scenarios, multiple users may interact with the software application displaying and/or presenting navigation directions. For example, in a vehicle a passenger may interact with the software application to help direct the driver or to find stop off points along the route. At the same time, the driver may also periodically view the directions presented by the software application. Passengers, however, may also interfere with the navigation session by for example, inappropriately modifying the route.

SUMMARY

In some implementations, a mapping application prevents unauthorized users from making changes to the route during a navigation session through audio requests. More specifically, the mapping application may assign authorization levels and/or priority levels to one or more authorized users. These users may include the owner of the client device executing the mapping application or other users identified in a user profile for the mapping application. The mapping application then assigns authorization levels and/or priority levels for additional users who are not included in the user profile for the mapping application. These authorization levels and/or priority levels may be lower than the authorization levels and/or priority levels for the users identified in the user profile.

The mapping application may allow users assigned a first authorization level to modify the route via an audio request. For example, these users can change the destination, add or remove stop off points along the route, adjust route preferences (e.g., to avoid tollways), stop the navigation session, or modify the route in any suitable manner. In addition to modifying the route, users assigned the first authorization level can ask for information related to the route, such as where the nearest city is, how much longer it will take until they reach the destination, what is the population of the current town they are in, how did the town get its name, etc. This level of authorization may be referred to herein as "read/write" authorization, because users assigned this authorization level may receive or "read" information from the mapping application, and may modify the route or "write" to the mapping application.

The mapping application may not allow users assigned a second authorization level to modify the route via an audio request. Instead, these users may only ask for information related to the route. This level of authorization may be referred to herein as "read-only" authorization, because users assigned this authorization level may receive or "read" information from the mapping application, but cannot modify the route or "write" to the mapping application.

To identify a user making an audio request, the mapping application analyzes an audio sample from the user. For example, the mapping application may analyze the audio for a trigger word or phrase (also referred to herein as a "hot word") which is spoken by the user to initiate the request. The mapping application may compare voice characteristics of the audio sample to pre-stored voice characteristics of users included in the user profile. If there is a match, the mapping application may identify the user as the matching person included in the user profile and may assign the corresponding authorization level and/or priority level included in the user profile to the user.

On the other hand, if the voice characteristics of the audio sample do not match with any of the pre-stored voice characteristics of the users included in the user profile, the mapping application may assign a default authorization level and/or priority level to the user. In some implementations, the default authorization level is a read-only authorization level. In this manner, the user can only receive information from the mapping application and cannot modify the route.

In addition to assigning authorization levels, the mapping application may assign priority levels to users. When multiple users provide requests to the mapping application during a navigation session simultaneously, one after another, and/or within a threshold time period of each other, the mapping application may respond to the requests in order of the respective priority levels of the users. Additionally, when a request is made within a threshold time period or threshold distance of the next navigation instruction and the user's priority level is not above a threshold priority level, the mapping application may wait to respond to the request until the navigation instruction is provided if the user's priority level is below a threshold priority level. Furthermore, if a first user having a higher priority level provides a request to the mapping application while the mapping application is responding to a request from a second user having a lower priority level, the mapping application may stop responding to the second user's request and may immediately respond to the first user. On the other hand, if the first user's priority level is not above the second user's priority level, the mapping application may wait to finish responding to the second user's request before responding to the first user.

In any event, the mapping application may respond to an audio request to modify the route from an authorized user by modifying the route and/or providing an audio announcement indicating that the route has been modified. The mapping application may respond to an audio request to modify the route from an unauthorized user by providing an audio announcement indicating that the request cannot be completed because the user is unauthorized to make the request. Additionally or alternatively, the mapping application may request an authorized user to confirm that the route modification is acceptable. If the mapping application receives confirmation from an authorized user that the route modification is acceptable, the mapping application may modify the route.

In this manner, the mapping application prevents unauthorized users from interfering with a navigation session. The mapping application can automatically identify a user based on their voice and does not automatically assume that the user is the owner of the device which can be inaccurate. Furthermore, the mapping application prioritizes requests such that the most important requests directly related to the navigation are answered immediately, while ancillary requests about locations along the route are responded to when convenient.

One example embodiment of the techniques of this disclosure is a method for role-based authorization during a navigation session. The method includes receiving a request for navigation directions from a starting location to a destination location, and providing a set of navigation directions for traversing to the destination location along a route. During the navigation session, the method includes receiving an audio request from a user related to the route, determining an authorization level of the user based on the audio request, and providing a response to the request based on the authorization level of the user.

Another example embodiment of the techniques of this disclosure is a computing device for role-based authorization during a navigation session. The computing device includes one or more processors, and a computer-readable memory coupled to the one or more processors and storing instructions thereon. The computer-readable memory may be non-transitory. The instructions, when executed by the one or more processors, cause the computing device to receive a request for navigation directions from a starting location to a destination location, and provide a set of navigation directions for traversing to the destination location along a route. During the navigation session, the instructions cause the computing device to receive an audio request from a user related to the route, determine an authorization level of the user based on the audio request, and provide a response to the request based on the authorization level of the user.

Yet another example embodiment of the techniques of this disclosure is a computer-readable memory storing instructions thereon. The computer-readable memory may be non-transitory. The instructions, when executed by one or more processors, cause the one or more processors to receive a request for navigation directions from a starting location to a destination location, and provide a set of navigation directions for traversing to the destination location along a route. During the navigation session, the instructions cause the one or more processors to receive an audio request from a user related to the route, determine an authorization level of the user based on the audio request, and provide a response to the request based on the authorization level of the user.

DETAILED DESCRIPTION

Overview

Figure 1:
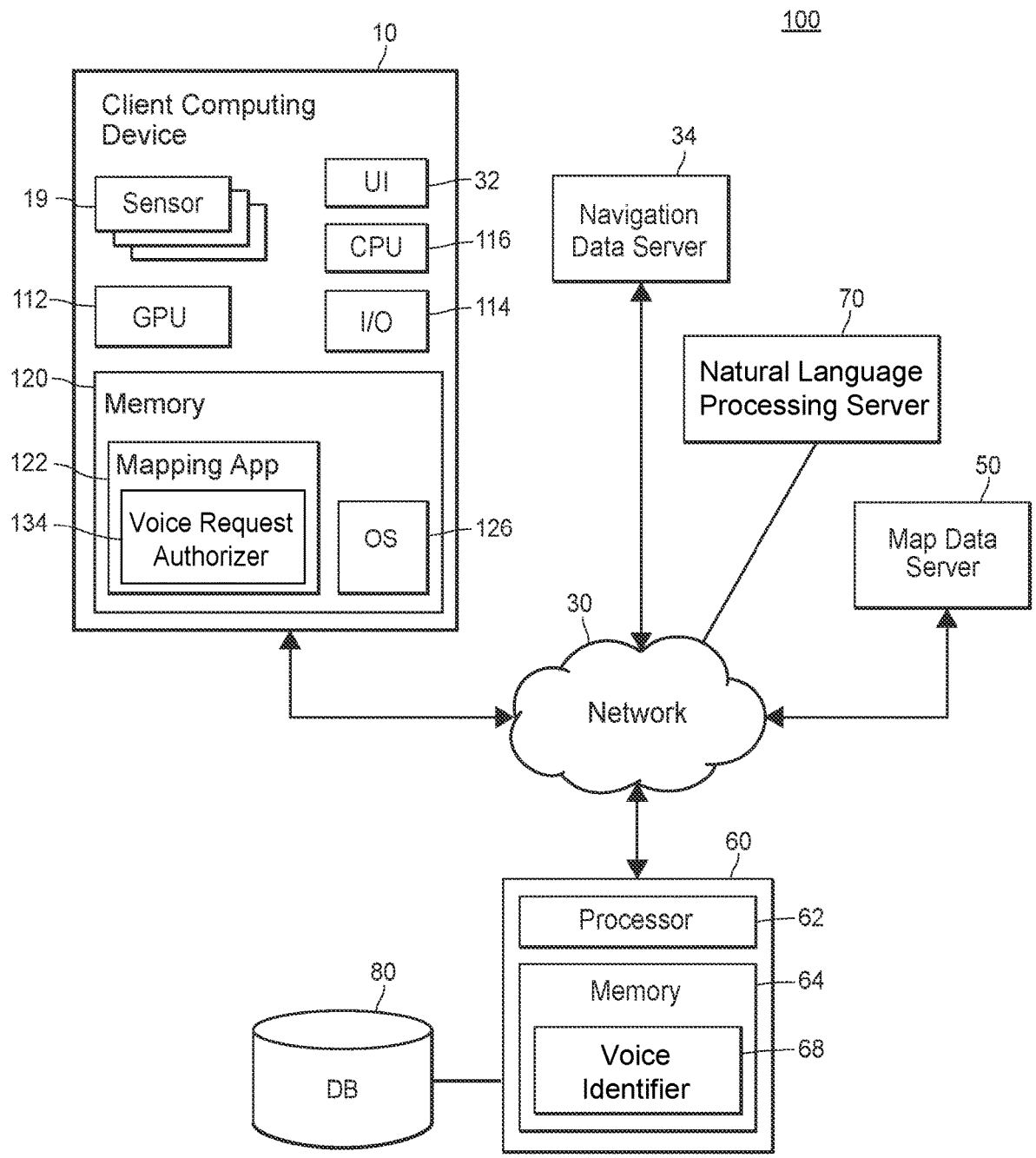
FIG. 1 is a block diagram of an example system in which techniques for role-based authorization during a navigation session can be implemented.

Generally speaking, the techniques for role-based authorization during a navigation session can be implemented in one or several client devices, one or several network servers, or a system that includes a combination of these devices. However, for clarity, the examples below focus primarily on an embodiment in which a client device executing a mapping application obtains and stores voice characteristics from audio samples of users associated with the client device in a user profile. The client device also stores authorization levels and/or priority levels for each user in the user profile.

Additionally, the client device may receive a request for navigation directions from a starting location to a destination location and provides the request to a server device. The server device generates a set of navigation directions for traversing a route to the destination location in response to the request and provides the set of navigation directions to the client device.

During a navigation session, the client device may receive an audio request from a user related to the route and identifies the user based on the audio request. The client device may analyze the audio to obtain voice characteristics of the user's voice and compare the voice characteristics to the voice characteristics of users stored in the user profile, for example using machine learning techniques. The client device may also analyze the audio to determine a distance between the user and the client device, an estimated age of the user, or any other suitable information to identify the user. In any event, if the characteristics of the user's voice matches the voice characteristics of one of the users stored in the user profile, the client device identifies the user having the matching voice and determines the authorization level and/or priority level for the identified user based on the user profile. If the characteristics of the user's voice do not match the voice characteristics of any of the users stored in the user profile, the client device automatically assigns the user a default authorization level and/or priority level, which may be the lowest authorization level such as the read-only authorization level. In other implementations, the client device transmits the audio to a server device that analyzes the audio and identifies the user using machine learning techniques.

Additionally, the client device transcribes the audio request to text and analyzes the text to determine the type of audio request. In other implementations, the client device transmits the text to a natural language processing server to determine the type of audio request. The client device then determines whether the user is authorized for the audio request based on the type of audio request and the user's authorization level.

For example, if the user has read-only authorization and the type of audio request is to modify the route, the client device determines that the user is unauthorized to make the audio request. As a result, the client device generates a response indicating that the user is unauthorized to make the audio request and provides the response to the user. In another example, if the user has read-write authorization and the type of audio request is to modify the route, the client device determines that the user is authorized to make the audio request. The client device may then transmit the requested route modification to a navigation server that recalculates the route in accordance with the requested route modification and provides an updated set of navigation directions to the client device. The client device may then generate a response indicating that the route has been modified and provides the updated set of navigation directions to the user.

Example Hardware and Software Components

An example communication system 100 in which a role-based authorization navigation system can be implemented is illustrated in FIG. 1. The communication system 100 includes a client device 10 configured to execute a geographic application 122, which also can be referred to as "mapping application 122." Depending on the implementation, the application 122 can display an interactive digital map, request and receive routing data to provide driving, walking, or other navigation directions including audio navigation directions, provide various geolocated content, etc. The client device 10 may be operated by a user (also referred to herein as a "driver") displaying a digital map while navigating to various locations.

In addition to the client device 10, the communication system 100 includes a server device 60 configured to provide trained machine learning models to the client device 10. The server device 60 can be communicatively coupled to a database 80 that stores, in an example implementation, a first machine learning model for identifying a user based on an audio sample of the user's voice. The training data used as a training input for the first machine learning model may include audio features for a set of audio streams of users' voices (i.e., characteristics of each voice such as frequencies, pitches, tones, amplitudes, etc.), and identification information of the user corresponding to each voice. Additionally, the database 80 may store a second machine learning model for determining whether a user is an adult or a child. The training data used as a training input for the second machine learning model may include characteristics of voices and indications of whether each voice is a child's voice or an adult's voice.

More generally, the server device 60 can communicate with one or several databases that store any type of suitable geospatial information or information that can be linked to a geographic context. The communication system 100 also can include a navigation data server 34 that provides navigation directions such as driving, walking, biking, or public transit directions, for example. Further, the communication system 100 can include a map data server 50 that provides map data to the server device 60 for generating a map display. Still further, the communication system can include a speech recognition server (not shown) and/or a natural language processing server 70 for transcribing and interpreting audio requests. The devices operating in the communication system 100 can be interconnected via a communication network 30.

In various implementations, the client device 10 may be a smartphone or a tablet computer. The client device 10 may include a memory 120, one or more processors (CPUs) 116, a graphics processing unit (GPU) 112, an I/O module 114 including a microphone and speakers, a user interface (UI) 132, and one or several sensors 19 including a Global Positioning Service (GPS) module. The memory 120 can be a non-transitory memory and can include one or several suitable memory modules, such as random access memory (RAM), read-only memory (ROM), flash memory, other types of persistent memory, etc. The I/O module 114 may be a touch screen, for example. In various implementations, the client device 10 can include fewer components than illustrated in FIG. 1 or conversely, additional components. In other embodiments, the client device 10 may be any suitable portable or non-portable computing device. For example, the client device 10 may be a laptop computer, a desktop computer, a wearable device such as a smart watch or smart glasses, etc.

The memory 120 stores an operating system (OS) 126, which can be any type of suitable mobile or general-purpose operating system. The OS 126 can include application programming interface (API) functions that allow applications to retrieve sensor readings. For example, a software application configured to execute on the computing device 10 can include instructions that invoke an OS 126 API for retrieving a current location of the client device 10 at that instant. The API can also return a quantitative indication of how certain the API is of the estimate (e.g., as a percentage).

The memory 120 also stores a mapping application 122, which is configured to generate interactive digital maps and/or perform other geographic functions, as indicated above. The mapping application 122 can receive navigation instructions including audio navigation instructions and present the navigation instructions. The mapping application 122 also can display driving, walking, or transit directions, and in general provide functions related to geography, geolocation, navigation, etc. Additionally, the mapping application 122 can obtain audio requests from users via the voice request authorizer 134. The voice request authorizer 134 may also determine an authorization level for the user, determine the nature of the audio request, and generate and provide a response to the audio request based on the authorization level of the user and the nature of the audio request.

It is noted that although FIG. 1 illustrates the mapping application 122 as a standalone application, the functionality of the mapping application 122 also can be provided in the form of an online service accessible via a web browser executing on the client device 10, as a plug-in or extension for another software application executing on the client device 10, etc. The mapping application 122 generally can be provided in different versions for different respective operating systems. For example, the maker of the client device 10 can provide a Software Development Kit (SDK) including the mapping application 122 for the Android™ platform, another SDK for the iOS™ platform, etc.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a voice identifier 68, which can generate a first machine learning model for identifying a user based on an audio sample of the user's voice and a second machine learning model for determining whether a user is an adult or a child.

The voice identifier 68 and the voice request authorizer 134 can operate as components of a role-based authorization navigation system. Alternatively, the role-based authorization navigation system can include only server-side components and simply provide the voice request authorizer 134 with responses to audio requests. In other words, role-based authorization navigation techniques in these embodiments can be implemented transparently to the voice request authorizer 134. As another alternative, the entire functionality of the voice identifier 68 can be implemented in the voice request authorizer 134. More generally, the voice identifier 68 and the voice request authorizer 134 may execute on the client device 10, the server device 60, or any suitable combination of these.

For simplicity, FIG. 1 illustrates the server device 60 as only one instance of a server. However, the server device 60 according to some implementations includes a group of one or more server devices, each equipped with one or more processors and capable of operating independently of the other server devices. Server devices operating in such a group can process requests from the client device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the voice request authorizer 134 operating in the client device 10 receives and transmits data to the server device 60 and/or the navigation data server 34. Thus, in one example, the client device 10 may transmit a communication to the navigation data server 34 requesting navigation directions from a starting location to a destination. Accordingly, the navigation data server 34 may generate a set of navigation instructions and provide the set of navigation instructions to the client device 10. In other implementations, the client device 10 may generate the set of navigation instruction locally via the mapping application 122. The client device 10 may also transmit an audio sample to the voice identifier 68 (implemented in the server device 60) for generating the first machine learning model for identifying a user based on an audio sample of the user's voice and/or for generating the second machine learning model for determining whether a user is an adult or a child.

The client device 10 may then apply audio features for an audio request to the first machine learning model to identify the user making the audio request and/or may apply the audio features to the second machine learning model to determine whether the user is an adult or a child.

Additionally, the client device 10 may transmit a transcribed version of the audio request to the natural language processing server 70 to interpret the audio request. In other implementations, the client device 10 may transmit the audio request to a speech recognition server (not shown) which transcribes the audio request to text using speech recognition techniques. In any event, a grammar mapping module (not shown) within the natural language processing server 70 may then compare the transcribed audio request to grammar rules in a grammar rules database. For example, based on the grammar rules, for the transcribed audio request, "Where is the nearest service station?" the grammar may determine that the request type is a query with the parameters "nearest" and "service station." In another example, based on the grammar rules, for the transcribed audio request, "Please add a stop at 123 Main Street," the grammar may determine that the request type is a route modification having the subtype added stop with the parameter "123 Main Street." In addition or as an alternative to the grammar rules database, the natural language processing server 70 or the client device 10 may include a machine learning model for identifying request types, request subtypes, and parameters. The machine learning model may be trained using several transcribed audio requests as training data, where each transcribed audio request is assigned a request type, request subtypes, and/or parameters. Then when a transcribed audio request is provided where the request type, subtypes, and/or parameters are unknown, the transcribed audio request may be provided to the machine learning model to automatically determine the request type, subtypes, and/or parameters based on a comparison to the training data.

Moreover, the grammar mapping module may make inferences based on context. For example, the transcribed audio request, "What's that building?" does not specify which building. However, the grammar mapping module may infer that the audio request is for the building closest to the current location of the client device 10. In some implementations, the grammar mapping module may find synonyms or nicknames for words or phrases to interpret the audio request.

Then based on the request type and the user's authorization level, the client device 10 may determine if the user is authorized to make the request. For example, if the user has read-only authorization and the request type is a route modification, the client device 10 may determine that the user is not authorized to make the request. The client device 10 may then generate a response indicating that the request cannot be completed. In some implementations, the client device 10 may ask an authorized user to confirm the request and then the client device 10 may complete the request.

If the user is authorized to make the request, the client device 10 may transmit the interpreted audio request to the navigation data server 34, the map data server 50, or any other suitable server for responding to the audio request, such as a knowledge base. The client device 10 may then generate a response to the request. The response may include an indication that the request has been completed, such as that the route has been modified. Additionally, the response may include updated navigation directions in accordance with the modified route or an answer to the query provided by the user.

In some implementations, the mapping application 122 obtains voice features for users associated with the client device 10 and stores the voice features in a user profile. The voice features may include raw voice recordings of the users. In other implementations, the voice features may include voice characteristics which are stored in the user profile rather than the raw voice recordings. The voice characteristics may be stored as a feature vector which encodes the characteristics of the voice (e.g., frequencies, pitches, tones, amplitudes, etc.). The owner of the client device 10 may permit the mapping application 122 to obtain audio requests which may allow the mapping application 122 to obtain voice features. The client device 10 may also obtain and store authorization levels and/or priority levels for each user in the user profile. Users associated with the client device 10 may include an owner of the client device 10, the significant other of the owner, friends and/or family of the owner, etc. For each user, the owner may assign an authorization level to the user, such as read/write, read-only, a category (e.g., high, medium, low), a numeric authorization level, etc. In some implementations, the owner may also assign a priority level to the user, such as a category (e.g., high, medium or low), a numeric priority level, etc.

In other implementations, the mapping application 122 does not store voice features in a user profile. Instead, when a user makes an audio request for navigation directions, the mapping application 122 obtains the voice features of the audio request and assigns the read/write authorization level to the user making the audio request. The mapping application 122 assigns the read-only authorization level to any other users.

Figure 2:
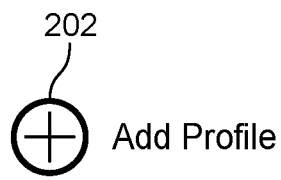
FIG. 2 is an example navigation display of a user profile that includes pre-stored voice characteristics of users and their respective authorization/priority levels.

FIG. 2 illustrates an example navigation display 200 that includes pre-stored voice characteristics of users and their respective authorization/priority levels. The navigation display 200 may be presented on the user interface 132 of the client device 10. The navigation display 200 may include a user control 202 for adding a user to the user profile. In response to selecting the user control 202, a user may provide a voice recording. In some implementations, the user may provide a voice recording reciting a particular term or phrase. The particular term or phrase may be a trigger term or phrase (also referred to herein as a "hot word") that causes the mapping application 122 to obtain an audio request, such as "Hey Navigate," or "Hey Nav." In this manner, when a user makes an audio request during a navigation session, the mapping application 122 may compare an audio sample of the user saying the same phrase as in the stored voice recording, which may increase the accuracy of the voice identification.

The mapping application 122 may assign a default authorization level to a new user added to the user profile, such as the read-only authorization level. Additionally, the mapping application 122 may assign a default priority level to a new user added to the user profile, such as a priority level which is lower than the priority levels for the other users in the user profile. Moreover, the mapping application 122 may include user controls to change the authorization level to a read/write authorization level or any other suitable authorization level. Additionally, the mapping application 122 may include user controls to change the priority level to any suitable priority level.

For each set of voice features in the user profile, the client device 10 may analyze the set of voice features to determine characteristics of the respective user's voice (e.g., frequencies, pitches, tones, amplitudes, etc.). The mapping application 122 may compare the voice characteristics of each of the pre-stored voice features to voice characteristics of a user providing an audio request during a navigation session using machine learning techniques. The machine learning techniques may include linear regression, polynomial regression, logistic regression, random forests, boosting, nearest neighbors, Bayesian networks, neural networks such as convolutional neural networks, support vector machines, or any other suitable machine learning technique. For example, the voice characteristics for each set of pre-stored voice features may be stored as template features. Then each of these template features may be compared to the features for a user providing an audio request.

In some embodiments, the template features may be compared to the features for a user providing an audio request using a nearest neighbors algorithm. The nearest neighbors algorithm may identify template features which are the closest to the features of the user providing the audio request by creating numerical representations of the features to generate feature vectors, such as pitch, tone, amplitude, for example. The numerical representations of the features or feature vectors of the user making the audio request may be compared to the feature vectors of pre-stored voice features to determine a vector distance between the features of the user providing the audio request and each set of pre-stored voice features. The mapping application 122 may identify the user providing the audio request based on the amount of similarity, or the vector distance in the nearest neighbors algorithm, between the features for the user providing the audio request and the features for each set of pre-stored voice features. If the vector distance for one of the sets of pre-stored voice features is less than a threshold distance, the mapping application 122 may determine that there is a match and identify the user as the user in the set of pre-stored voice features. In other implementations, the mapping application 122 provides the voice recordings and/or the characteristics of each voice recording to the server device 60. The voice identifier 68 in the server device 60 then performs the machine learning.

Then during a navigation session, when a user initiates an audio request by saying a hot word, such as "Hey Navigate" or "Hey Nav" the mapping application 122 obtains an audio sample of the user saying the hot word and determines voice characteristics of the audio sample. The mapping application 122 then compares the voice characteristics of the audio sample to the voice characteristics of each of the sets of pre-stored voice features in the manner described above to identify the user.

The mapping application 122 may also identify the user and/or assign an authorization level to the user by determining whether the user is an adult or a child. For example, if the user's voice does not match any of the sets of pre-stored voice features, the mapping application 122 may assign the read-only authorization level to the user if the user is a child and the read/write authorization level to the user if the user is an adult. To determine whether the user is an adult or a child, the mapping application 122 may apply the voice characteristics of the user to a machine learning model for determining whether a user is an adult or a child. In some implementations, the voice identifier 68 in the server 60 device generates the machine learning model by obtaining audio samples of children saying a particular term or phrase, such as a hot word and audio samples of adults saying the same particular term or phrase. The voice identifier 68 obtains a set of voice characteristics for each of the audio samples and labels the set of voice characteristics as corresponding to an adult or a child. The voice identifier 68 then generates the machine learning model using various machine learning techniques such as a regression analysis (e.g., a logistic regression, linear regression, or polynomial regression), k-nearest neighbors, decisions trees, random forests, boosting (e.g., extreme gradient boosting), neural networks (e.g., a convolutional neural network), support vector machines, deep learning, reinforcement learning, Bayesian networks, etc.

The voice identifier 68 then analyzes the training data to generate the machine learning model for determining whether a user is an adult or a child. For example, when the machine learning technique is a neural network, the voice identifier 68 may generate a graph having input nodes, intermediate or "hidden" nodes, edges, and output nodes. The nodes may represent a test or function performed on voice characteristics and the edges may represent connections between nodes. In some embodiments, the output nodes may include indications of whether the audio stream corresponds to an adult or a child. The indications may be likelihoods that the audio stream corresponds to an adult or a child.

For example, a neural network may include four inputs nodes representing voice characteristics that are each connected to several hidden nodes. The hidden nodes are then connected to an output node that indicates whether the audio stream corresponds to an adult or a child. The connections may have assigned weights and the hidden nodes may include tests or functions performed on the audio characteristics.

In this example, the four input nodes may include the frequency, amplitude, pitch, and tone of an audio stream. Tests or functions may be applied to the input values at the hidden nodes. Then the results of the tests or functions may be weighted and/or aggregated to determine a likelihood that the audio stream corresponds to a child. When the likelihood is above a threshold likelihood, the neural network may determine that the audio stream corresponds to a child. Otherwise, the neural network may determine that the audio stream corresponds to an adult.

However, this is merely one example of the inputs and resulting output of the neural network for determining whether a user is an adult or a child. In other examples, any number of input nodes may include any suitable voice characteristics for an audio stream. Additionally, any number of output nodes may determine likelihoods of an audio stream corresponding to a child or an adult. For example, the input nodes may include the audio stream or waveform or a frequency-based representation of the audio waveform, such as a spectrogram.

As additional training data is collected, the weights, nodes, and/or connections may be adjusted. In this manner, the machine learning model is constantly or periodically updated.

In any event, the voice identifier 68 may provide the machine learning model to the client device 10. Then the client device 10 may apply the voice characteristics for a user to the machine learning model to determine whether the user is an adult or a child.

Still further, the mapping application 122 may identify the user and/or assign an authorization level to the user based on the distance of the user from the client device 10. The client device 10 may include multiple microphones at different positions within the client device 10. When a user provides an audio request, the client device 10 may determine the direction and/or distance of the user relative to the client device 10 based on the time delay between each of the microphones receiving the audio. The client device 10 may also determine the distance of the user relative to the client device 10 based on the intensity/volume of the audio request. For example, the intensity/volume of the audio request may decrease in proportion to the distance from the client device 10. In some implementations, the mapping application 122 may assign a first authorization level to users within a threshold distance of the client device 10 and a second authorization level to users that are not within the threshold distance of the client device 10. For example, the first authorization level may be the read/write authorization level and the second authorization level may be the read-only authorization.

In other implementations, the mapping application 122 may identify the user and/or assign an authorization level to the user based on any suitable combination of matching the user's voice with sets of pre-stored voice features of known users, determining whether the user is an adult or a child, and/or determining the distance between the user and the client device 10. For example, when the user's voice does not match with a set of pre-stored voice features, the mapping application 122 may assign an authorization level to the user based on a combination of whether the user is an adult or a child and the distance between the user and the client device 10. More specifically, the mapping application 122 may assign a first score to the user based on whether the user is an adult or a child and second score to the user based on the distance between the user and the client device 10. Then the mapping application 122 may combine the first and second scores in any suitable manner. The mapping application 122 may assign the user a first authorization level (e.g., read/write authorization) when the combined scores exceed a threshold score and may assign the user a second authorization level (e.g., read-only authorization) when the combined scores do not exceed the threshold score.

In addition to assigning authorization levels, the mapping application 122 may assign priority levels to users providing audio requests. When a user matches a set of pre-stored voice features, the mapping application 122 assigns the priority level associated with the set of pre-stored voice features in the user profile. When the user does not match a set of pre-stored voice features, the mapping application 122 may assign a default priority level to the user. The default priority level may be a priority level which is lower than the priority levels included in the user profile or the priority levels assigned to users during the navigation session. In other implementations, the default priority level may be the same priority level as each of the users assigned the same authorization level as the user or may be the lowest priority level for user assigned the same authorization level as the user.

When multiple users provide requests to the mapping application 122 during a navigation session simultaneously, one after another, and/or within a threshold time period of each other, the mapping application 122 may respond to the requests in order of the respective priority levels of the users. Additionally, when a request is made within a threshold time period or threshold distance of the next navigation instruction and the user's priority level is not above a threshold priority level, the mapping application 122 may wait to respond to the request until the navigation instruction is provided if the user's priority level is below a threshold priority level. Furthermore, if a first user having a higher priority level provides a request to the mapping application 122 while the mapping application 122 is responding to a request from a second user having a lower priority level, the mapping application 122 may stop responding to the second user's request and may immediately respond to the first user. On the other hand, if the first user's priority level is not above the second user's priority level, the mapping application 122 may wait to finish responding to the second user's request before responding to the first user.

Still further, the mapping application 122 may assign a maximum threshold number of requests to each priority level, such that a user having a particular priority level may not provide more than the threshold number of requests assigned to the particular priority level during the navigation session. In other implementations, when a user having a particular priority level reaches the maximum threshold number of requests for the particular priority level, the user may not provide another request for a threshold time period (e.g., two minutes, ten minutes, an hour, etc.). For example, the user may not be able to make more than five requests over a 30 minute time period.

Moreover, the mapping application 122 may assign rules for when users having each priority level can make audio requests. For example, users having a first priority level may only make audio requests when the vehicle is not moving (e.g., when the vehicle is at a gas station or waiting at a traffic light). Other users having a second priority level which is higher than the first priority level may make audio requests any time. Yet other users having a third priority level which is higher than the first priority level but lower than the second priority level may make audio requests when the vehicle is moving, but may not make audio requests within a threshold time period or threshold distance of the next navigation instruction.

FIG. 3-6 illustrate example scenarios 300-600 in a vehicle where a user provides an audio request during a navigation session. The user may be a driver, a front seat passenger, or a back seat passenger in the vehicle. While each of these examples is driving directions these are merely a few examples for ease of illustration only. The role-based authorization navigation system can be used for any suitable mode of transportation including driving, walking, biking, or public transportation.

Figure 3:
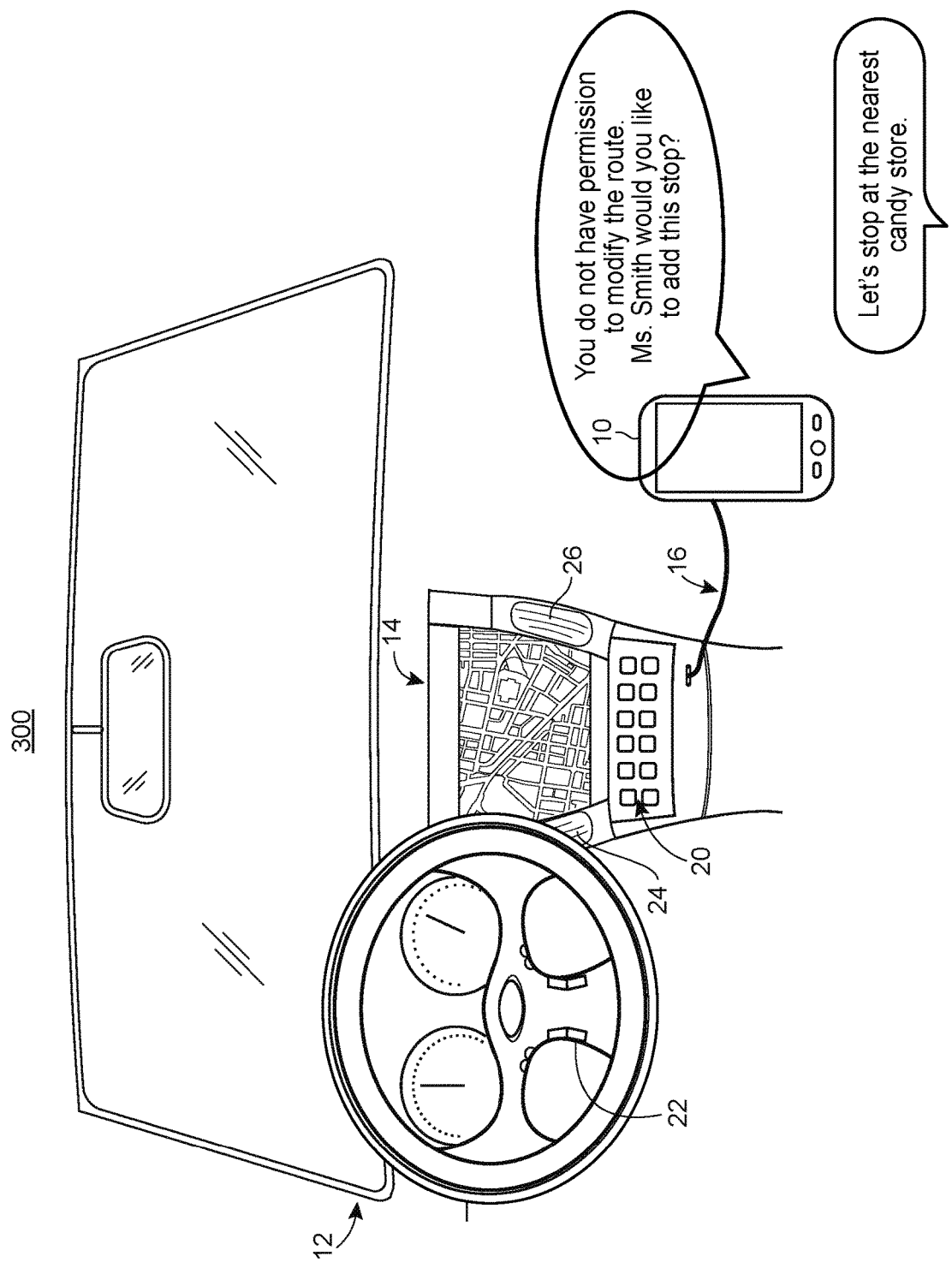
FIG. 3 illustrates an example scenario in a vehicle in which an audio request is made by an unauthorized user.

FIG. 3 illustrates an example vehicle 12 which includes a client device 10 and a head unit 14. The client device 10 communicates with the head unit 14 of the vehicle 12 via a communication link 16, which may be wired (e.g., Universal Serial Bus (USB)) or wireless (e.g., Bluetooth, Wi-Fi Direct). The client device 10 also can communicate with various content providers, servers, etc. via a wireless communication network such as a fourth- or third-generation cellular network (4G or 3G, respectively).

The head unit 14 can include a display 18 for presenting navigation information such as a digital map. The display 18 in some implementations is a touchscreen and includes a software keyboard for entering text input, which may include the name or address of a destination, point of origin, etc. Hardware input controls 20 and 22 on the head unit 14 and the steering wheel, respectively, can be used for entering alphanumeric characters or to perform other functions for requesting navigation directions. The head unit 14 also can include audio input and output components such as a microphone 24 and speakers 26, for example. The speakers 26 can be used to play audio instructions or audio notifications sent from the client device 10.

In the example scenario 300, during a navigation session where the client device 10 provides navigation directions from to a destination location, a user from the back seat of the vehicle 12 provides the audio request, "Let's stop at the nearest candy store." In some implementations, prior to the audio request the user states, "Hey Navigation," "Hey Nav," or any other suitable hot word to trigger the mapping application 122 to obtain the audio request. The mapping application 122 may then identify the user based on the audio request. For example, the mapping application 122 may analyze the audio of the user saying the hot word, the audio of the request, or a combination of these to determine characteristics of the user's voice. Then the mapping application 122 may apply the voice characteristics to the first machine learning model generated based on sets of pre-stored voice features of users in the user profile, which may be generated by the server device 60.

In the example scenario 300, the mapping application 122 may determine that the user's voice characteristics match with a user in the user profile having read-only authorization. In another example, the mapping application 122 may determine that the user's voice characteristics do not match with any of the user's in the user profile and may assign a default authorization level to the user which may be read-only authorization. In yet another example, the mapping application 122 may determine that the user's voice characteristics do not match with any of the user's in the user profile and may apply the user's voice characteristics to the second machine learning model for determining whether the user is an adult or a child, which may be generated by the server device 60. The mapping application 122 may also determine the distance between the client device 10 and the user. The mapping application 122 may assign the user the read-only authorization based on any suitable combination of the determination of whether the user is an adult or a child and the distance between the client device 10 and the user.

Additionally, the mapping application 122 may analyze the audio request ("Let's stop at the nearest candy store") to interpret the audio request. The mapping application 122 may transmit a transcribed version of the audio request to the natural language processing server 70 to interpret the audio request. In other implementations, the client device 10 may transmit the audio request to a speech recognition server (not shown) which transcribes the audio request to text using speech recognition techniques. In any event, the natural language processing server 70 may then compare the transcribed audio request to grammar rules in a grammar rules database. The grammar may determine that the request type is a route modification having the subtype added stop with the parameters "nearest" and "candy store."

Then the natural language processing server 70 may transmit the request type and parameters to the mapping application 122. The mapping application 122 may determine that the route modification request type requires read/write authorization. Accordingly, the mapping application 122 determines that the user is not authorized to make the audio request. As a result, the mapping application 122 generates a response indicating that the user is not authorized to make the audio request. Additionally, the response asks an authorized user (Mrs. Smith) to confirm the audio request. The mapping application 122 then provides the response, "You do not have permission to modify the route. Mrs. Smith would you like to add this stop?" to the user.

Figure 4:
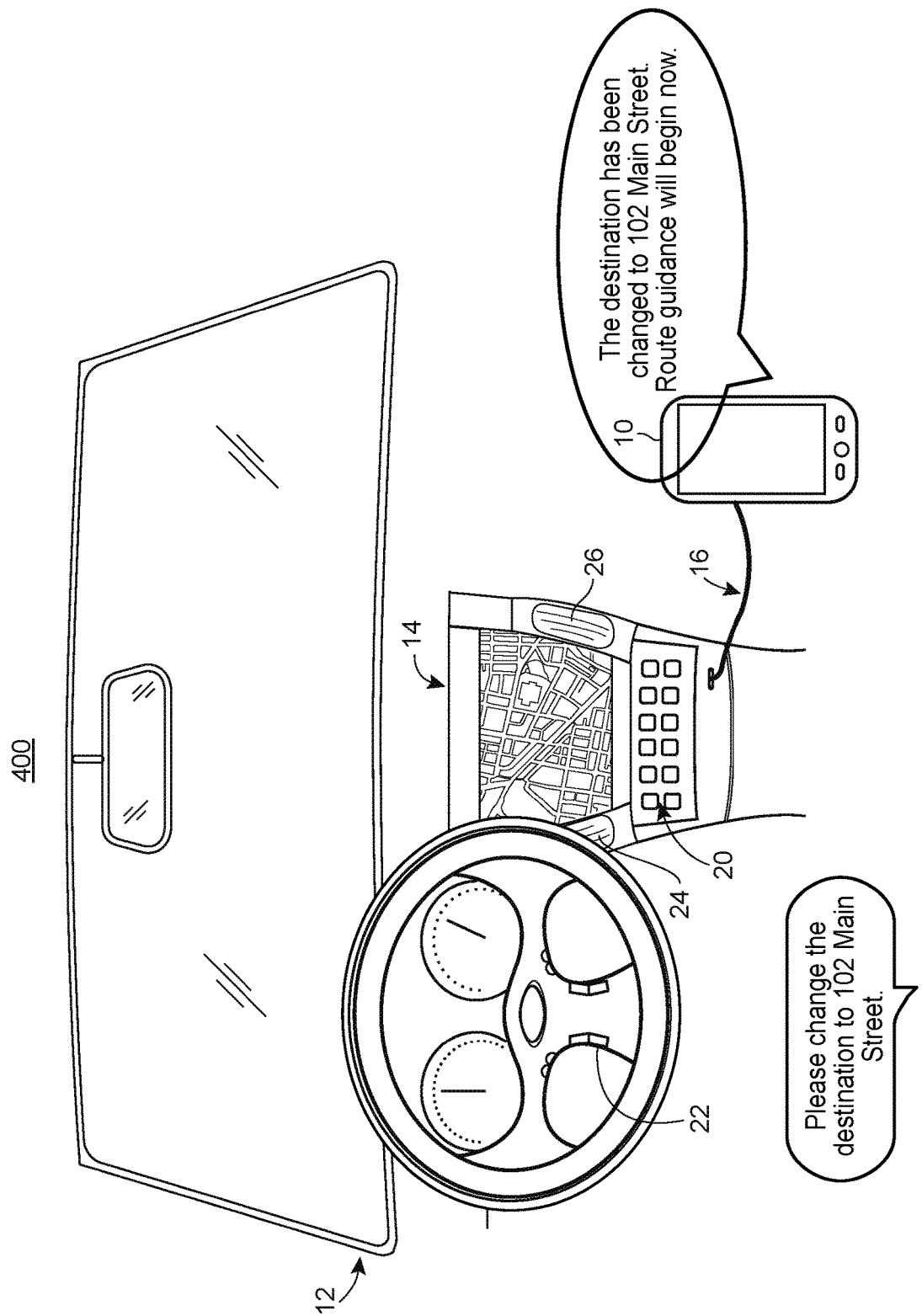
FIG. 4 illustrates another example scenario in a vehicle in which an audio request is made by an authorized user.

FIG. 4 illustrates another example scenario 400 in a vehicle 12. During a navigation session where the client device 10 provides navigation directions from to a destination location, a user from the driver seat of the vehicle 12 provides the audio request, "Please change the destination to 102 Main Street." In some implementations, prior to the audio request the user states, "Hey Navigation," "Hey Nav," or any other suitable hot word to trigger the mapping application 122 to obtain the audio request. The mapping application 122 may then identify the user based on the audio request. For example, the mapping application 122 may analyze the audio of the user saying the hot word, the audio of the request, or a combination of these to determine characteristics of the user's voice. Then the mapping application 122 may apply the voice characteristics to the first machine learning model generated based on sets of pre-stored voice features of users in the user profile, which may be generated by the server device 60.

In the example scenario 400, the mapping application 122 may determine that the user's voice characteristics match with a user in the user profile having read/write authorization. In another example, the mapping application 122 may determine that the user's voice characteristics do not match with any of the user's in the user profile and may apply the user's voice characteristics to the second machine learning model for determining whether the user is an adult or a child, which may be generated by the server device 60. The mapping application 122 may also determine the distance between the client device 10 and the user. The mapping application 122 may assign the user the read/write authorization based on any suitable combination of the determination of whether the user is an adult or a child and the distance between the client device 10 and the user. For example, the mapping application 122 may determine the user is an adult and is within a threshold distance from the client device 10. Therefore, the mapping application 122 may assign the user the read/write authorization.

Additionally, the mapping application 122 may analyze the audio request ("Please change the destination to 102 Main Street") to interpret the audio request. The mapping application 122 may transmit a transcribed version of the audio request to the natural language processing server 70 to interpret the audio request. In other implementations, the client device 10 may transmit the audio request to a speech recognition server (not shown) which transcribes the audio request to text using speech recognition techniques. In any event, the natural language processing server 70 may then compare the transcribed audio request to grammar rules in a grammar rules database. The grammar may determine that the request type is a route modification having the subtype new destination with the parameter "102 Main Street."

Then the natural language processing server 70 may transmit the request type and parameters to the mapping application 122. The mapping application 122 may determine that the route modification request type requires read/write authorization. Accordingly, the mapping application 122 determines that the user is authorized to make the audio request. As a result, the mapping application 122 transmits a request to the navigation data server 34 for navigation directions from the current location of the client device 10 to 102 Main Street. The mapping application 122 receives the navigation directions from the navigation data server 34 and generates a response indicating that the user is authorized to make the audio request and that the request has been completed. The mapping application 122 then provides the response, "The destination has been changed to 102 Main Street. Route guidance will begin now" to the user.

Figure 5:
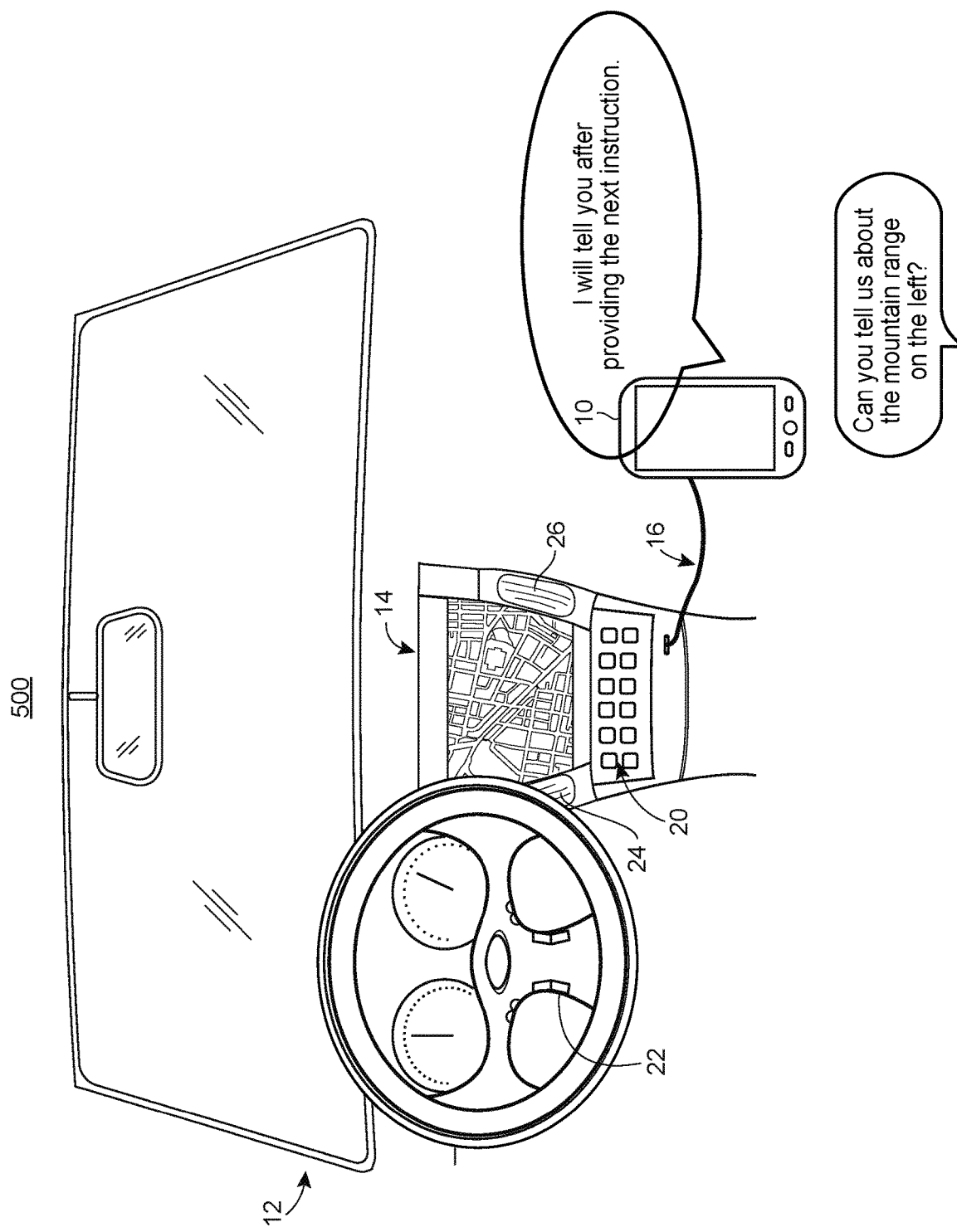
FIG. 5 illustrates yet another example scenario in a vehicle in which an audio request is made by a user having a low priority level.

FIG. 5 illustrates yet another example scenario 500 in a vehicle 12. During a navigation session where the client device 10 provides navigation directions to a destination location, a user from the back seat of the vehicle 12 provides the audio request, "Can you tell us about the mountain range on the left?" In some implementations, prior to the audio request the user states, "Hey Navigation," "Hey Nav," or any other suitable hot word to trigger the mapping application 122 to obtain the audio request. The mapping application 122 may then identify the user based on the audio request. For example, the mapping application 122 may analyze the audio of the user saying the hot word, the audio of the request, or a combination of these to determine characteristics of the user's voice. Then the mapping application 122 may apply the voice characteristics to the first machine learning model generated based on sets of pre-stored voice features of users in the user profile, which may be generated by the server device 60.

In the example scenario 500, the mapping application 122 may determine that the user's voice characteristics match with a user in the user profile having read-only authorization. In another example, the mapping application 122 may determine that the user's voice characteristics do not match with any of the user's in the user profile and may assign a default authorization level to the user which may be read-only authorization. In yet another example, the mapping application 122 may determine that the user's voice characteristics do not match with any of the user's in the user profile and may apply the user's voice characteristics to the second machine learning model for determining whether the user is an adult or a child, which may be generated by the server device 60. The mapping application 122 may also determine the distance between the client device 10 and the user. The mapping application 122 may assign the user the read-only authorization based on any suitable combination of the determination of whether the user is an adult or a child and the distance between the client device 10 and the user.

Additionally, the mapping application 122 may determine that the user's voice characteristics match with a user in the user profile having a particular priority level. In another example, the mapping application 122 may determine that the user's voice characteristics do not match with any of the user's in the user profile and may assign a default priority level to the user.

Additionally, the mapping application 122 may analyze the audio request ("Can you tell us about the mountain range on the left") to interpret the audio request. The mapping application 122 may transmit a transcribed version of the audio request to the natural language processing server 70 to interpret the audio request. In other implementations, the client device 10 may transmit the audio request to a speech recognition server (not shown) which transcribes the audio request to text using speech recognition techniques. In any event, the natural language processing server 70 may then compare the transcribed audio request to grammar rules in a grammar rules database. The grammar may determine that the request type is a query with the parameters "mountain range," "current location," and "east."

Then the natural language processing server 70 may transmit the request type and parameters to the mapping application 122. The mapping application 122 may determine that the query request type requires read-only authorization. Accordingly, the mapping application 122 determines that the user is authorized to make the audio request. Additionally, the mapping application 122 determines that client device 10 is within a threshold time period or distance of arriving at a location for the next maneuver in the navigation directions. Then the mapping application 122 compares the user's priority level to a threshold priority level. If the user's priority level exceeds the threshold priority level, the mapping application 122 may respond to the request immediately. Otherwise, the mapping application 122 responds to the request after the user completes the next maneuver, and/or when there is a sufficient break between maneuvers such that the client device 10 is not within a threshold time period or distance of arriving at the next location for the next maneuver. In other implementations, the mapping application 122 compares the user's authorization level to a threshold authorization level to determine whether to respond immediately or wait.

In the example scenario 500, the user's priority level does not exceed the threshold priority level. Accordingly, the mapping application 122 generates a response indicating that the mapping application 122 will respond to the request after the next maneuver. The mapping application 122 then provides the response, "I will tell you after providing the next instruction."

Figure 6:
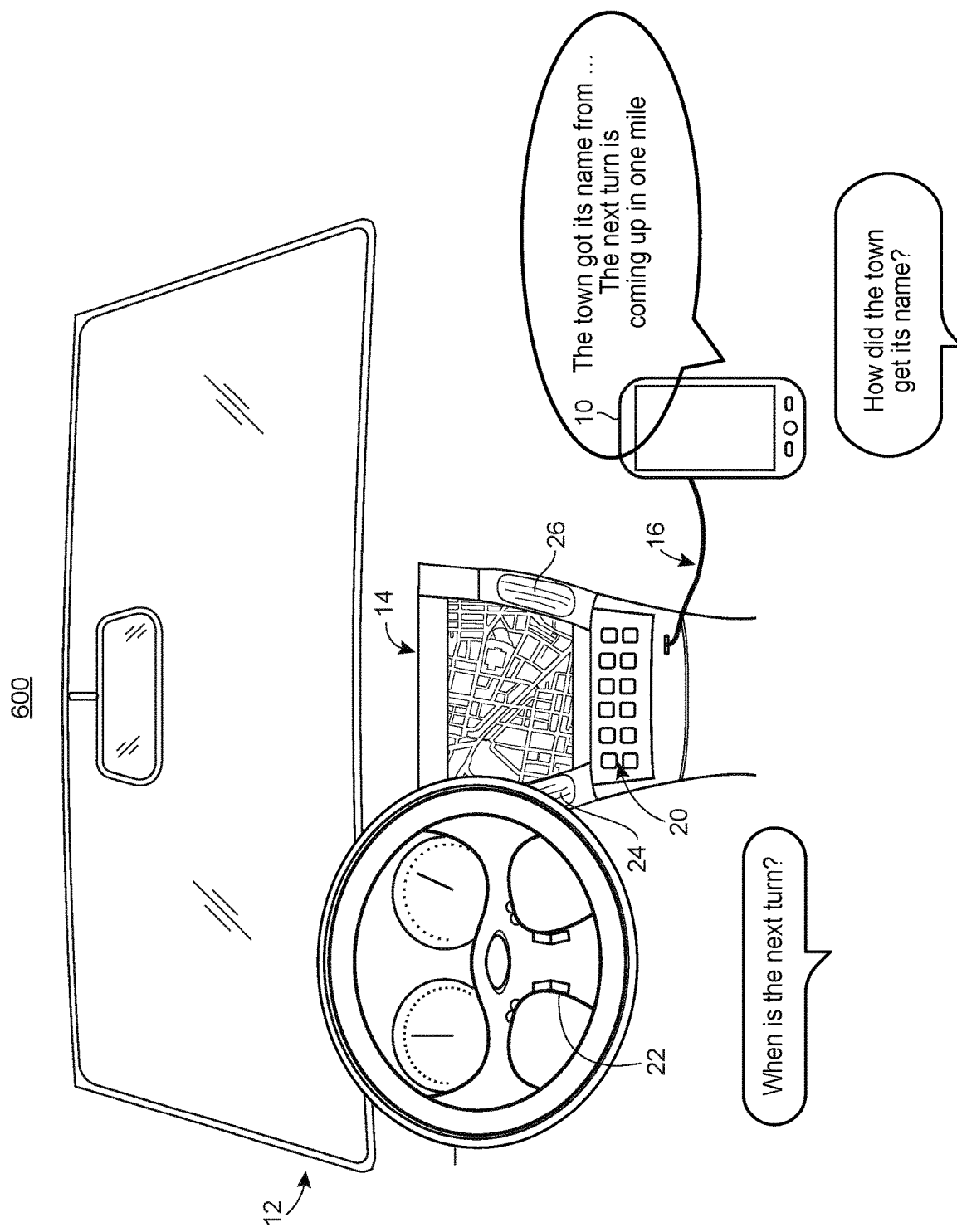
FIG. 6 illustrates another example scenario in a vehicle in which a first user makes a first audio request and a second user makes a second audio request after the mapping application begins responding to the first audio request.

FIG. 6 illustrates another example scenario 600 in a vehicle 12. During a navigation session where the client device 10 provides navigation directions from to a destination location, a first user from the back seat of the vehicle 12 provides the audio request, "How did the town get its name?" In some implementations, prior to the audio request the first user states, "Hey Navigation," "Hey Nav," or any other suitable hot word to trigger the mapping application 122 to obtain the audio request. The mapping application 122 may then identify the first user based on the audio request. For example, the mapping application 122 may analyze the audio of the first user saying the hot word, the audio of the request, or a combination of these to determine characteristics of the user's voice. Then the mapping application 122 may apply the voice characteristics to the first machine learning model generated based on sets of pre-stored voice features of users in the user profile, which may be generated by the server device 60.

In the example scenario 600, the mapping application 122 may determine that the first user's voice characteristics match with a user in the user profile having read-only authorization. In another example, the mapping application 122 may determine that the first user's voice characteristics do not match with any of the user's in the user profile and may assign a default authorization level to the user which may be read-only authorization. In yet another example, the mapping application 122 may determine that the first user's voice characteristics do not match with any of the user's in the user profile and may apply the first user's voice characteristics to the second machine learning model for determining whether the first user is an adult or a child, which may be generated by the server device 60. The mapping application 122 may also determine the distance between the client device 10 and the first user. The mapping application 122 may assign the user the read-only authorization based on any suitable combination of the determination of whether the first user is an adult or a child and the distance between the client device 10 and the first user.

Additionally, the mapping application 122 may determine that the first user's voice characteristics match with a user in the user profile having a particular priority level (e.g., 2). In another example, the mapping application 122 may determine that the first user's voice characteristics do not match with any of the user's in the user profile and may assign a default priority level to the user (e.g., 2).

Additionally, the mapping application 122 may analyze the audio request ("How did the town get its name?") to interpret the audio request. The mapping application 122 may transmit a transcribed version of the audio request to the natural language processing server 70 to interpret the audio request. In other implementations, the client device 10 may transmit the audio request to a speech recognition server (not shown) which transcribes the audio request to text using speech recognition techniques. In any event, the natural language processing server 70 may then compare the transcribed audio request to grammar rules in a grammar rules database. The grammar may determine that the request type is a query with the parameters "origin" "town in current location," and "name." As a result, the mapping application 122 transmits a request to a knowledge base for the origin of the name of the town at the location of the client device 10. The mapping application 122 receives an explanation of the origin of the name of the town from the knowledge base and generates a response indicating how the town got its name. The mapping application 122 then provides the response, "The town got its name from . . . " to the first user.

As the mapping application 122 responds to the request, a second user from the driver's seat of the vehicle 12 provides the audio request, "When is the next turn?" In some implementations, prior to the audio request the second user states, "Hey Navigation," "Hey Nav," or any other suitable hot word to trigger the mapping application 122 to obtain the audio request. The mapping application 122 may then identify the second user based on the audio request. For example, the mapping application 122 may analyze the audio of the second user saying the hot word, the audio of the request, or a combination of these to determine characteristics of the second user's voice. Then the mapping application 122 may apply the voice characteristics to the first machine learning model generated based on sets of pre-stored voice features of users in the user profile, which may be generated by the server device 60.

In the example scenario 600, the mapping application 122 may determine that the second user's voice characteristics match with a user in the user profile having read/write authorization. In another example, the mapping application 122 may determine that the second user's voice characteristics do not match with any of the users in the user profile and may apply the second user's voice characteristics to the second machine learning model for determining whether the second user is an adult or a child, which may be generated by the server device 60. The mapping application 122 may also determine the distance between the client device 10 and the second user. The mapping application 122 may assign the second user the read/write authorization based on any suitable combination of the determination of whether the second user is an adult or a child and the distance between the client device 10 and the second user. For example, the mapping application 122 may determine the second user is an adult and is within a threshold distance from the client device 10. Therefore, the mapping application 122 may assign the second user the read/write authorization.

Additionally, the mapping application 122 may determine that the second user's voice characteristics match with a user in the user profile having a particular priority level (e.g., 1). In another example, the mapping application 122 may determine that the second user's voice characteristics do not match with any of the user's in the user profile and may assign a default priority level to the user (e.g., 1).

Additionally, the mapping application 122 may analyze the audio request ("When is the next turn?") to interpret the audio request. The mapping application 122 may transmit a transcribed version of the audio request to the natural language processing server 70 to interpret the audio request. In other implementations, the client device 10 may transmit the audio request to a speech recognition server (not shown) which transcribes the audio request to text using speech recognition techniques. In any event, the natural language processing server 70 may then compare the transcribed audio request to grammar rules in a grammar rules database. The grammar may determine that the request type is a query with the parameter "next turn."

Then the natural language processing server 70 may transmit the request type and parameters to the mapping application 122. The mapping application 122 may determine that the query request type requires read-only authorization. Accordingly, the mapping application 122 determines that the second user is authorized to make the audio request.

Furthermore, the mapping application 122 compares the priority level and/or the authorization level of the second user to the priority level and/or the authorization level of the first user. If the priority level and/or authorization level of the second user exceeds the priority level and/or authorization level of the first user, the mapping application 122 interrupts the current response and immediately responds to the second user. Otherwise, the mapping application 122 responds to the second user after responding to the first user. In some implementations, the mapping application 122 may determine whether the second audio request is related to navigation. If the second audio request is related to navigation and the first audio request is not related to navigation, the mapping application 122 may interrupt the current response and immediately respond to the second user. In yet other implementations, the mapping application 122 determines whether to interrupt the current response based on a combination of the priority levels/authorization levels of the users and whether the requests are related to navigation.

In the example scenario 600, the priority level of the second user (e.g., 1) exceeds the priority level of the first user (e.g., 2). Accordingly, the mapping application 122 interrupts the current response and generates a respond to the second audio request. The mapping application 122 obtains information regarding the next turn from the navigation directions, and generates a response regarding the next turn. The mapping application 122 then interrupts the current response and provides the response, "The next turn is coming up in one mile" to the second user.

Example Method for Role-Based Authorization During a Navigation Session

Figure 7:
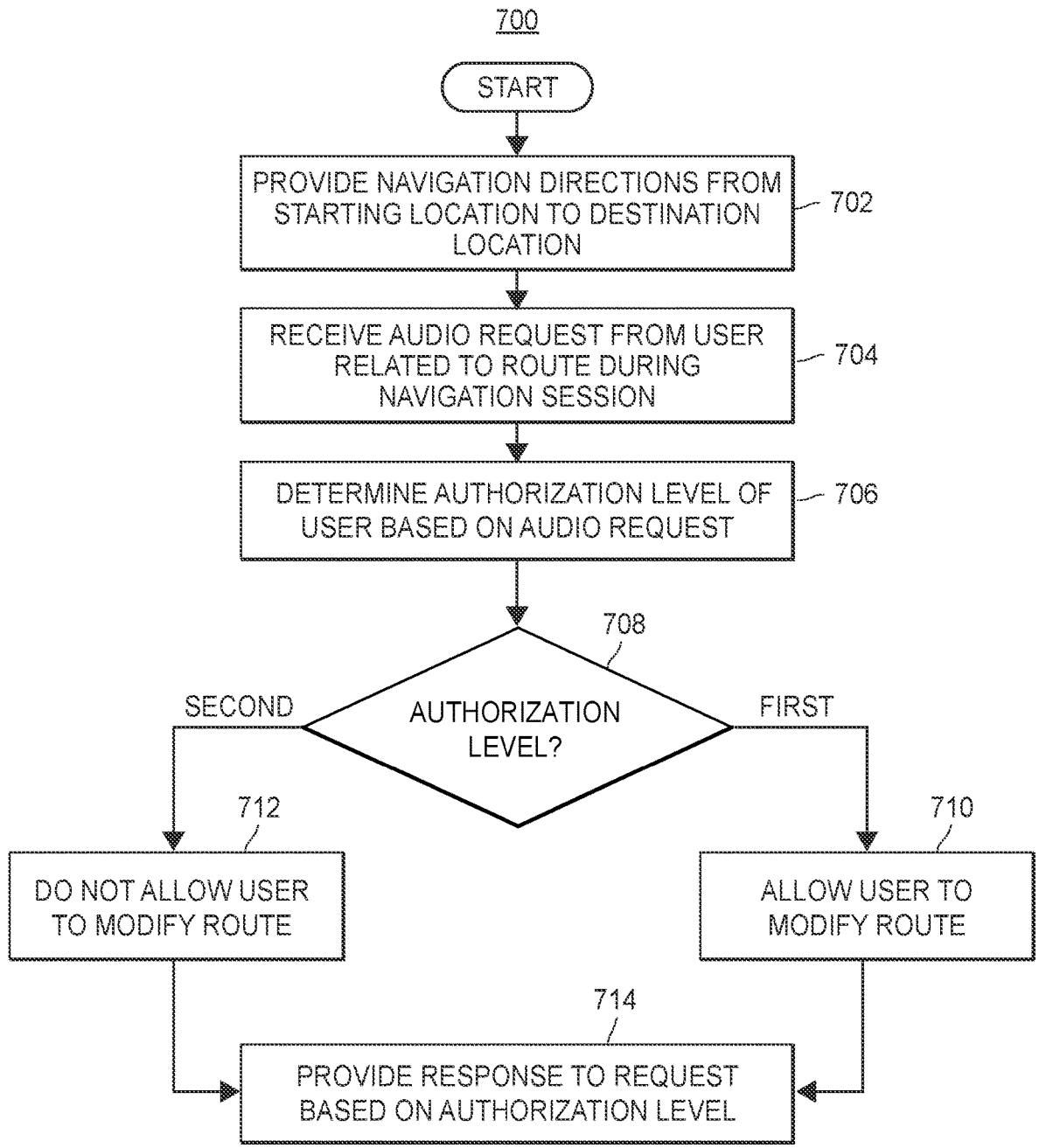
FIG. 7 is a flow diagram of an example method for role-based authorization during a navigation session, which can be implemented in a computing device.

FIG. 7 illustrates a flow diagram of an example method 700 for role-based authorization during a navigation session. The method can be implemented in a set of instructions stored on a computer-readable memory and executable at one or more processors of the client device 10. For example, the method can be implemented by the voice request authorizer 134 and/or the mapping application 122. In other implementations, the method can be implemented in a set of instructions stored on a computer-readable memory and executable at one or more processors of the server device 60. For example, the method can be implemented by the voice identifier 68.

At block 702, a set of navigation instructions are provided from a starting location to a destination location. For example, when a user requests navigation directions from a starting location to a destination location, the mapping application 122 may provide the request to a navigation data server 34. The navigation data server 34 may then provide a set of navigation directions to the client device 10 which may be presented by the mapping application 122.

Then during a navigation session, the mapping application 122 may receive an audio request from a user related to the route (block 704). The audio request may be to modify the route, such as to change the destination location, add a stop to the route, remove a stop from route, recalculate the route based on a modified route preference (e.g., avoid tolls), stop the navigation session, etc. The audio request may also be a query related to the route, such as to provide information regarding the route such as when the user is expected to arrive at the destination location, or to provide information regarding a location along the route, such as a landmark on the route.

At block 706, the mapping application 122 determines an authorization level of the user based on the audio request. For example, the mapping application 122 may analyze the audio of the user saying a hot word, the audio of the request, or a combination of these to determine characteristics of the user's voice. Then the mapping application 122 may apply the voice characteristics to a first machine learning model generated based on sets of pre-stored voice features of users in a user profile, which may be generated by the server device 60. The mapping application 122 may determine the authorization level for the user is the authorization level associated with the matching set of pre-stored voice features in the user profile.

The mapping application 122 may also apply the user's voice characteristics to a second machine learning model for determining whether the user is an adult or a child, which may be generated by the server device 60. The mapping application 122 may also determine the distance between the client device 10 and the user. The mapping application 122 may assign the user the authorization level based on any suitable combination of the determination of whether the user is an adult or a child and the distance between the client device 10 and the user. For example, the mapping application 122 may determine the user is an adult and is within a threshold distance from the client device 10. Therefore, the mapping application 122 may assign the user a first authorization level. In another example, the mapping application 122 may determine the user is a child and is more than a threshold distance from the client device 10. Therefore, the mapping application 122 may assign the user a second authorization level.

If the user has a first authorization level such as a read/write authorization level, the mapping application 122 determines the user is allowed to modify the route (block 710). Otherwise, if the user has a second authorization level such as a read-only authorization level, the mapping application 122 determines the user is not allowed to modify the route and can only ask questions related to the route (block 712).

Then at block 714, the mapping application 122 provides a response to the audio request based on the user's authorization level. More specifically, the mapping application 122 may analyze the audio request to interpret the audio request. The mapping application 122 may transmit a transcribed version of the audio request to the natural language processing server 70 to interpret the audio request. In other implementations, the client device 10 may transmit the audio request to a speech recognition server (not shown) which transcribes the audio request to text using speech recognition techniques. In any event, the natural language processing server 70 may then compare the transcribed audio request to grammar rules in a grammar rules database. The grammar may determine the request type and the parameters for the request.

Then the natural language processing server 70 may transmit the request type and parameters to the mapping application 122. The mapping application 122 may determine that the route modification request type requires a first authorization level and the query request type requires a second authorization level. If the audio request requires the first authorization level and the user is assigned the first authorization level, the mapping application 122 completes the request. Otherwise, the mapping application 122 generates a response indicating that the user is not authorized to make the request. If the audio request requires the second authorization level which is lower than the first authorization level and the user is assigned the first or second authorization level, the mapping application 122 completes the request.

To complete the request, the mapping application 122 may transmit the parameters to a particular server, such as a navigation data server 34. Then the mapping application 122 generates and provides a response to the user based on the information obtained from the server.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 700 may include one or more function blocks, modules, individual functions or routines in the form of tangible computer-executable instructions that are stored in a computer-readable storage medium that may be non-transitory and executed using a processor of a computing device (e.g., a server device, a personal computer, a smart phone, a tablet computer, a smart watch, a mobile computing device, or other client device, as described herein). The method 700 may be included as part of any backend server (e.g., a map data server, a navigation server, or any other type of server computing device, as described herein), client device modules of the example environment, for example, or as part of a module that is external to such an environment. Though the figures may be described with reference to the other figures for ease of explanation, the method 700 can be utilized with other objects and user interfaces. Furthermore, although the explanation above describes steps of the method 700 being performed by specific devices (such as a server device 60 or client device 10), this is done for illustration purposes only. The blocks of the method 700 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for identifying driving event sounds through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for role-based authorization during a navigation session, the method comprising:
   receiving, by one or more processors of a client device, a request for navigation directions from a starting location to a destination location;
   providing, by the one or more processors, a set of navigation directions for traversing to the destination location along a route;
   during the navigation session, receiving, by the one or more processors, an audio request from a user related to the route;
   determining, by the one or more processors, a distance of the user from the client device based on the audio request;
   determining, by the one or more processors, an authorization level of the user based on the distance; and
   in response to determining the user is authorized to make the audio request based on the authorization level, providing, by the one or more processors, a response to the audio request based on the authorization level of the user including providing information to the user in response to the audio request related to the route.

2. The method of claim 1, wherein determining an authorization level of the user further includes:
   identifying, by the one or more processors, the user based on the audio request; and
   determining, by the one or more processors, the authorization level based on the identity of the user.

3. The method of claim 2, wherein identifying the user based on the audio request includes:
   analyzing, by the one or more processors, the audio request to identify voice characteristics of the audio request; and
   comparing, by the one or more processors, the voice characteristics of the audio request to one or more sets of pre-stored voice characteristics each corresponding to a particular person.

4. The method of claim 3, further comprising:
   in response to determining that the voice characteristics of the audio request do not match any of the one or more sets of pre-stored voice characteristics, assigning a lowest authorization level to the user.

5. The method of claim 1, further comprising:
   prior to the navigation session, receiving, by the one or more processors, an audio sample from the user and identification information for the user; and
   storing, by the one or more processors, voice characteristics of the audio sample in association with the identification information for the user.

6. The method of claim 1, wherein determining the authorization level of the user includes:
   determining, by the one or more processors, that the user has a first authorization level indicating that the user has permission to modify the route, or
   determining, by the one or more processors, that the user has a second authorization level indicating that the user does not have permission to modify the route.

7. The method of claim 1, wherein determining the authorization level of the user includes:
   determining, by the one or more processors, a priority level for the user, and further comprising:
   receiving, by the one or more processors, a plurality of audio requests from a plurality of users having a plurality of priority levels; and
   providing, by the one or more processors, responses to the plurality of audio requests in order of respective priority levels.

8. The method of claim 1, further comprising:
   in response to receiving a second audio request while responding to a first audio request, determining, by the one or more processors, whether a respective priority level for the second audio request is higher than a respective priority level for the first audio request; and
   interrupting, by the one or more processors, a response to the first audio request in response to determining that the respective priority level for the second audio request is higher than the respective priority level for the first audio request.

9. The method of claim 1, wherein providing the response to the audio request includes at least one of:
   modifying the route in response to the audio request,
   providing information regarding the route, or
   providing information regarding a location along the route.

10. The method of claim 9, wherein modifying the route in response to the audio request includes at least one of:
    changing the destination location,
    adding a stop to the route,
    removing a stop from the route,
    recalculating the route based on a modified route preference, or
    stopping the navigation session.

11. A computing device for role-based authorization during a navigation session, the computing device comprising:
    one or more processors; and
    a computer-readable memory coupled to the one or more processors and storing instructions thereon that, when executed by the one or more processors, cause the computing device to:
    receive, from a client device, a request for navigation directions from a starting location to a destination location;
    provide a set of navigation directions for traversing to the destination location along a route;
    during the navigation session, receive an audio request from a user related to the route;
    determine a distance of the user from the client device based on the audio request;
    determine an authorization level of the user based on the distance; and
    in response to determining the user is authorized to make the audio request based on the authorization level, provide a response to the audio request based on the authorization level of the user including provide information to the user in response to the audio request related to the route.

12. The computing device of claim 11, wherein to further determine an authorization level of the user, the instructions cause the computing device to:
    identify the user based on the audio request; and
    determine the authorization level based on the identity of the user.

13. The computing device of claim 12, wherein to identify the user based on the audio request, the instructions cause the computing device to:

analyze the audio request to identify voice characteristics of the audio request; and compare the voice characteristics of the audio request to one or more sets of pre-stored voice characteristics each corresponding to a particular person.

14. The computing device of claim 13, wherein the instructions further cause the computing device to:

in response to determining that the voice characteristics of the audio request do not match any of the one or more sets of pre-stored voice characteristics, assign a lowest authorization level to the user.

15. The computing device of claim 11, wherein the instructions further cause the computing device to:

prior to the navigation session, receive an audio sample from the user and identification information for the user; and store voice characteristics of the audio sample in association with the identification information for the user.

16. The computing device of claim 11, wherein the authorization level is at least one of:

a first authorization level indicating that the user has permission to modify the route, or a second authorization level indicating that the user does not have permission to modify the route.

17. A non-transitory computer-readable memory coupled to one or more processors and storing instructions thereon that, when executed by the one or more processors, cause the one or more processors to:

receive, from a client device, a request for navigation directions from a starting location to a destination location;

provide a set of navigation directions for traversing to the destination location along a route;

during the navigation session, receive an audio request from a user related to the route;

determine a distance of the user from the client device based on the audio request;

determine an authorization level of the user based on the distance; and in response to determining the user is authorized to make the audio request based on the authorization level, provide a response to the audio request based on the authorization level of the user including provide information to the user in response to the audio request related to the route.

18. The computer-readable memory of claim 17, wherein to further determine an authorization level of the user, the instructions cause the one or more processors to:

identify the user based on the audio request; and determine the authorization level based on the identity of the user.

19. The computer-readable memory of claim 18, wherein to identify the user based on the audio request, the instructions cause the one or more processors to:

analyze the audio request to identify voice characteristics of the audio request; and compare the voice characteristics of the audio request to one or more sets of pre-stored voice characteristics each corresponding to a particular person.

20. The computer-readable memory of claim 17, wherein the instructions further cause the one or more processors to:

in response to determining that the voice characteristics of the audio request do not match any of the one or more sets of pre-stored voice characteristics, assign a lowest authorization level to the user.

* * * * *